O. PEDERSON,
Assignor, by mesne assignments, to D. C. MEEHAN and R. G. JORDAN.
FURNITURE CASTER
No. 10,305. Reissued Apr. 3, 1883.
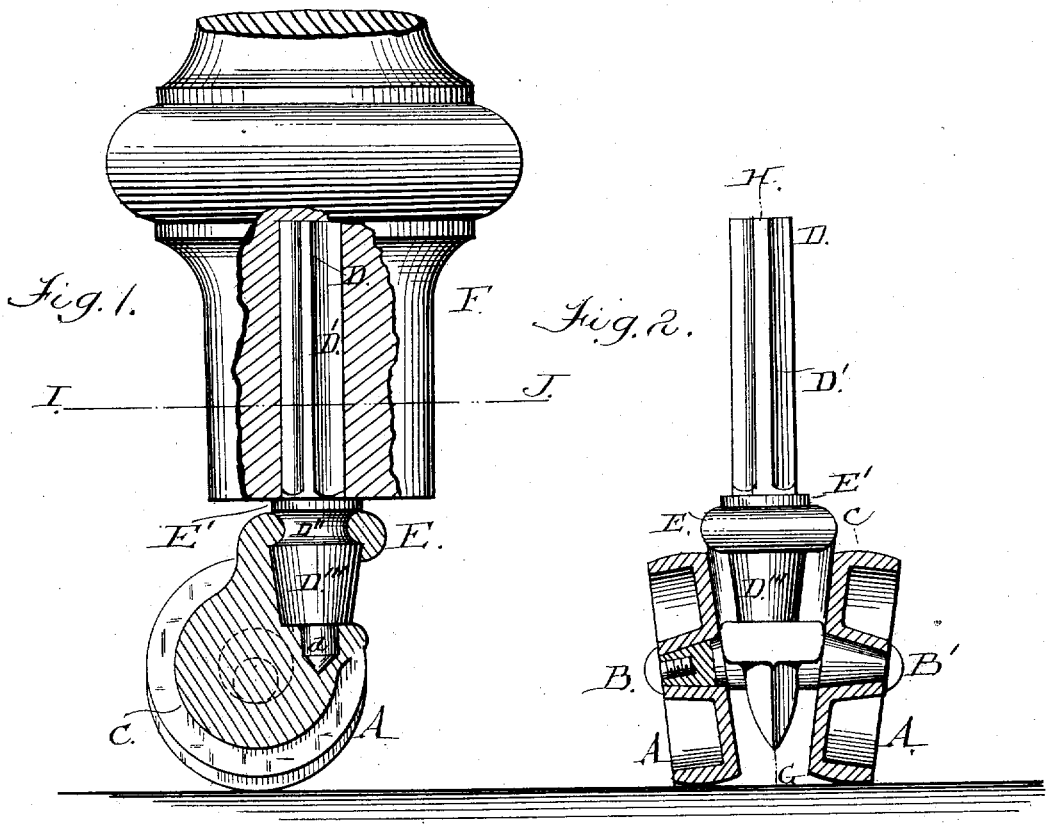
Fig. 3.
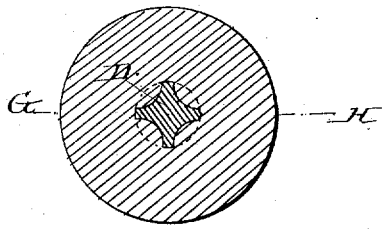
Attest;
L. Walter Fowler
H. B. Applewhaite,
Inventor;
Ole Pederson
per Attys.
A. H. Evans & Co.
N. PETERS, Photo-Lithographer, Washington, D. C.

UNITED STATES PATENT OFFICE.

OLE PEDERSON, OF COLUMBUS, OHIO, ASSIGNOR, BY MESNE ASSIGNMENTS, TO DAVID C. MEEHAN AND ROBERT G. JORDAN, OF SAME PLACE.

FURNITURE-CASTER.

SPECIFICATION forming part of Reissued Letters Patent No. 10,305, dated April 3, 1883.

Original No. 218,565, dated August 12, 1879. Application for reissue filed February 19, 1883.

*To all whom it may concern:*

Be it known that I, OLE PEDERSON, of Columbus, in the county of Franklin and State of Ohio, have invented certain new and useful Improvements in Furniture-Casters; and I do hereby declare the following to be a full, clear, and exact description of the invention, sufficient to enable one skilled in the art to which it belongs to make and use the same without further invention or experiment, reference being had to the drawings hereunto annexed, in which—

Figure 1 represents a sectional side view of my caster as applied to the leg of a piece of furniture; Fig. 2, an elevation of the same detached, showing section of ground-rollers. Fig. 3 is a horizontal section taken at I J, Fig. 1.

My invention relates to certain improvements in furniture-casters; and it consists of a peculiarly-shaped single shank with vertical stem cast loosely therein, having upon each side and solidly connected with said shank two inclined conical pivots carrying two oblique ground-rollers.

Referring to the drawings, C is the shank, D the vertical stem, and B and B′ the two conical pivots carrying ground-rollers A A. It will be seen that the axes of said pivots are inclined sufficiently to cause their under sides to attain a horizontal position, which inclination, by pitching the tops of said rollers outward and the bottoms inward—*i. e.*, toward each other—counteracts any tendency of the rollers to crowd the outer end of the pivots. I am aware that inclined pivots for pitching the rollers outward are not new, and therefore I do not claim such pivots, broadly. The conical shape of my pivots aids materially in holding the rollers steadily in position. The vertical stem D is constructed with a solid flange or shoulder, E′, made integral with the stem, whereby I am enabled to drive the stem into the leg of the furniture without injury to the rest of the caster.

Fig. 2 shows the rollers secured on pivots by screw, as in B, or solid head or knob, as at B′. In the latter case rollers must be cast first and cleaned, then set up in the mold in which the shank is to be cast, allowing the liquid metal to flow through their eyes, forming a knob upon the outside. This chills the metal, and, if it be "chilling-iron," renders the pivots extremely hard and durable. The metal in cooling shrinks away from the rollers, allowing them ample freedom to turn.

Again referring to the drawings, it will be seen that the vertical stem B consists in part of a fluted portion, D, that engages with the wood in which it is driven. The hole being bored somewhat smaller causes it (the wood) to take a firm hold upon the stem, retaining it securely in place. The journal of said stem consists of a conical part, D‴, in the top of which is the annular groove D″, which, engaging with metal of shank, keeps it from falling off when raised. Said conical portion of stem is terminated by the cylindrical part *d*, which rests in the step *d′*, formed on the side of the shank, and which receives the downward thrust of the stem, as shown in Fig. 1. Like the ground-rollers, it is necessary to cast the said stem first and set it up in the mold, and let the metal of shank flow around it and form the solid flange or shoulder E′; but as the shrinkage of metal in this case would tend to bind and prevent stem from turning freely, it will be found necessary to cover the surface of said stem with some substance like sand and shellac prior to setting up, to preserve sufficient space between surfaces.

It will thus be seen from the foregoing, owing to the limited amount of fitting necessary, that great economy is attained, and, from the extreme hardness of wearing-surfaces, great durability, the whole thrust of the stem being on the step *d′*.

Having thus described my invention, what I claim as new, and desire to secure by Letters Patent, is—

1. The vertical stem D, having the fluted portion D′, substantially as and for the purpose shown and described.

2. The vertical stem D, having the fluted portion D′, in combination with the shank C, provided with the inclined pivots B B′, connected solidly therewith, and the oblique ground-rollers A A, all constructed to operate substantially as and for the purpose described.

3. In a furniture-caster, the bearing-frame C, provided with the step $d'$, and collar E, in combination with a spindle, substantially as and for the purpose set forth.

4. In a furniture-caster, the shank C, provided with conical pivots B B′, step $d'$, and collar E, substantially as and for the purpose set forth.

5. The shank C, provided with the collar F, having the lip $i$, substantially as set forth.

OLE PEDERSON.

Witnesses:
GEO. O. MARTIN,
J. M. LOWE.